W. F. DE BRANDT.
GRAIN OR OTHER BOX OR COMPARTMENT OF HARVESTING MACHINES.
APPLICATION FILED APR. 4, 1919.
1,332,813. Patented Mar. 2, 1920.
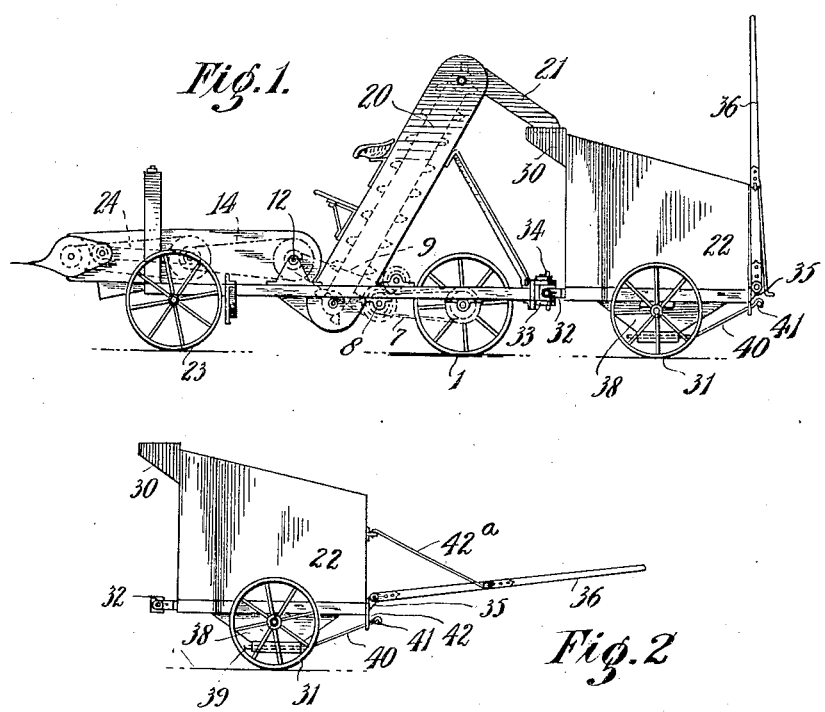
INVENTOR:
WILLIAM F. De BRANDT,
BY Lawrence Laurier
ATTORNEY.

UNITED STATES PATENT OFFICE.

WILLIAM FRANCIS DE BRANDT, OF MELBOURNE, VICTORIA, AUSTRALIA, ASSIGNOR TO THE 'FOGARTY' PATENT INTERCHANGEABLE HARVESTING CORPORATION LIMITED, OF PERTH, WESTERN AUSTRALIA, AUSTRALIA, A CORPORATION OF WESTERN AUSTRALIA.

GRAIN OR OTHER BOX OR COMPARTMENT OF HARVESTING-MACHINES.

1,332,813.      Specification of Letters Patent.      Patented Mar. 2, 1920.

Application filed April 4, 1919. Serial No. 287,468.

*To all whom it may concern:*

Be it known that I, WILLIAM FRANCIS DE BRANDT, a citizen of the Republic of France, and resident of Melbourne, in the State of Victoria and Commonwealth of Australia, secretary, have invented certain new and useful Improvements in and Relating to Grain or other Boxes or Compartments of Harvesting-Machines, of which the following is a specification.

This invention relates to improvements in the grain boxes of harvesting machines and has been specially devised in order to provide a grain box which will be of greater utility than those at present in use.

An essential feature of the invention consists in mounting upon a harvesting machine a wheeled grain box which is capable of being readily detached and removed on its own wheeled frame for transport purposes.

In order that the invention may be more readily understood it will now be described with reference to the accompanying drawings in which—

Figure 1 is a view in side elevation of the improved detachable grain box fitted to the frame of a harvesting machine.

Fig. 2 is a side elevation of the improved detachable grain box.

According to this invention, the grain box 22 consists of a rectangular or other shaped box formed with an inclined upper end 30 to allow of the reception of the chute or chutes 21 from the elevator casing 20 of the harvesting machine. This box 22 is mounted upon a pair of wheels 31 or a larger number of wheels may be used if desired. One end of the box 22 is fitted with a loop or eye bracket 32 adapted to engage a bifurcated member 33 on the harvester frame and be locked thereto by a detachable pin or bolt 34.

The opposite end of the box 22 is also provided with a loop or eye bracket 35 adapted to pivotally engage in a similar manner a draw bar carrying swingletrees or other appliances 36 for draft purposes.

The grain box is preferably fitted with an inclined bottom 38, the delivery orifice of which is substantially close to the ground and is closed by a hinged, or preferably, a sliding door 39 controlled by a link 40 held in a bracket 42 and fitted with a handle 41. This would enable the grain box to deliver into a sump or other receptacle adapted to receive the material. The draft bar 36 hinged to the grain box frame allows of the wheeled grain box to be transported, and may be held in its transport position by the detachable bar or link 42ª connected as illustrated.

By the use of a wheeled grain box adapted to be used in combination with harvester machines as above described, the grain can be speedily discharged where required, the transport and delivery of the material being facilitated during the harvesting operation, the grain box being fitted to any suitable form of harvesting machine without departing from the spirit and scope of the invention.

What I claim as my invention and desire to secure by Letters Patent is—

1. A grain carrier for harvesting machines comprising a box, having an inclined upper end, an inclined bottom, a delivery orifice at the bottom of the box and a door for said orifice; a link and hand control for the door; wheels; means for mounting the box on said wheels; a loop or eye bracket adapted to engage a bifurcated member on the harvester frame, a detachable pin or bolt for joining the loop and the bifurcated member and another loop or eye bracket at the rear of the box and pivotally engaging a draw bar carrying draft appliances.

2. A grain carrier for harvesting machines comprising a box, having an inclined bottom, a delivery opening in said bottom and a door for said opening; a link and handle for controlling said door; wheels supporting the box; a detachable coupling for connecting the box with the harvester frame; and a draft bar pivotally connected to the back of the box.

Signed at Melbourne, in the State of Victoria, Commonwealth of Australia, this sixth day of January A. D. 1919.

WILLIAM FRANCIS DE BRANDT.

Witnesses:
SIDNEY HENDLEY,
ANNIE EDWARDS.